Figure 5:
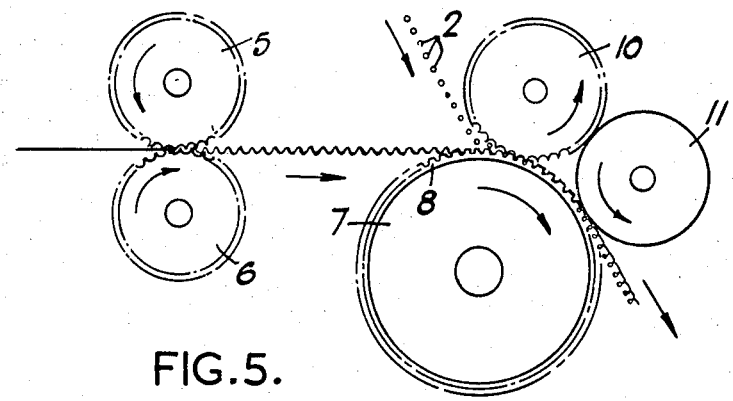

Jan. 5, 1960 D. GABOR 2,919,485
COMPOSITE FABRICS AND THE MANUFACTURE THEREOF
Filed Jan. 7, 1955 3 Sheets-Sheet 1
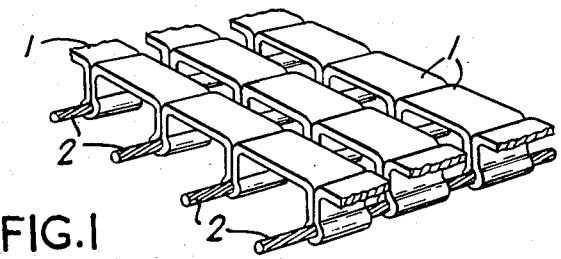
FIG.1
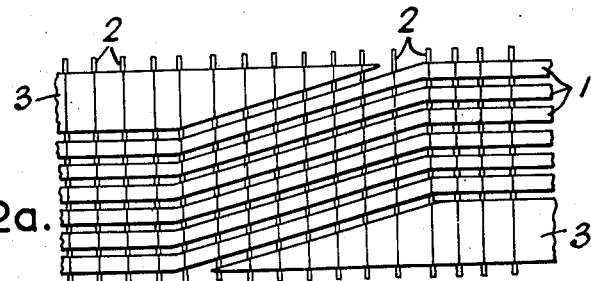
FIG.2a.
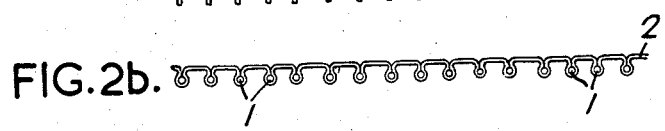
FIG.2b.
FIG.3.
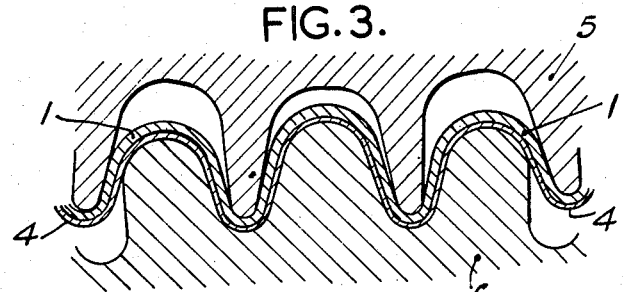
FIG.4.
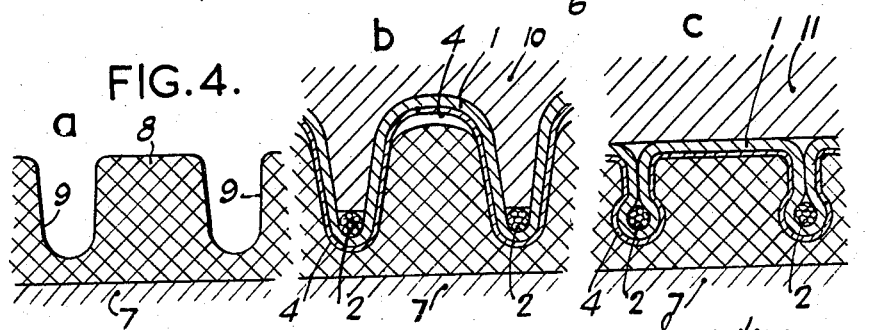
Inventor
Dennis Gabor
by Carl T. Mack
Attorney Jan. 5, 1960 D. GABOR 2,919,485
COMPOSITE FABRICS AND THE MANUFACTURE THEREOF
Filed Jan. 7, 1955 3 Sheets-Sheet 2

Inventor
Dennis Gabor
by Carl T. Mack
Attorney.

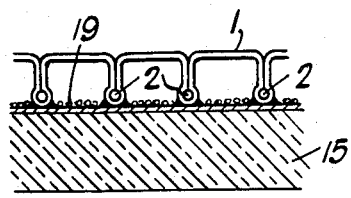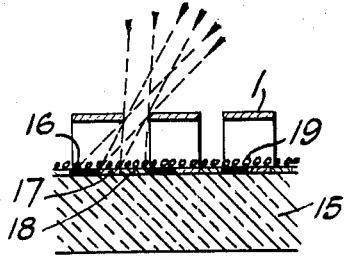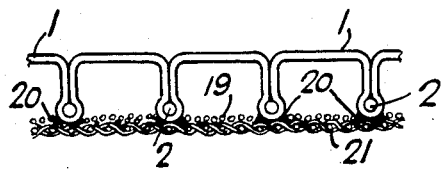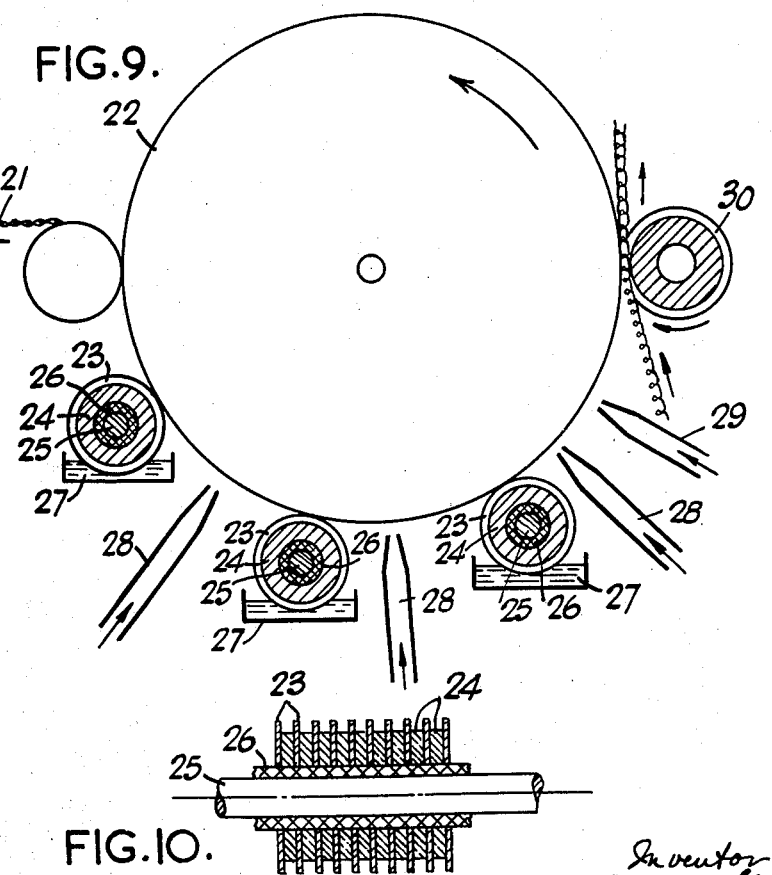

United States Patent Office 2,919,485
Patented Jan. 5, 1960

2,919,485

COMPOSITE FABRICS AND THE MANUFACTURE THEREOF

Dennis Gabor, London, England, assignor to National Research Development Corporation, London, England, a British corporation Application January 7, 1955, Serial No. 480,407

Claims priority, application Great Britain August 20, 1954

18 Claims. (Cl. 29—25.14)

This invention relates to methods of making a composite fabric consisting of metal and glass or equivalent materials, intended particularly for use in the manufacture of cathode ray tubes for television reception constructed according to copending patent application Serial No. 309,677, now abandoned, to apparatus for carrying out such methods and to the material which may be so made.

In the copending application above referred to a cathode ray tube is described which calls for the provision of an electrode structure in the form of a plane array of closely spaced, fine wire or strip conductors which in one form of tube therein described extend across the screen of the tube, double back across the tube in parallel spaced relation to the screen and curl back again for a short distance behind the array so formed. Transverse staggers are required between the various runs of the conductors. The formation of such an array presents obvious difficulties if the structure is to be made with the fine texture and accuracy of spacing necessary for the satisfactory operation of the tube.

The present invention has for one of its objects to provide a method of making such a structure, or at least a part thereof, or a material from which the final structure can be formed.

In one aspect the invention may be regarded as a method of making a composite fabric consisting of metallic strips extending in one dimension and strands of glass or like insulating material extending transversely thereto, comprising forming a base material in which said metallic strips are applied as foil deposits on a sheet or strip of carrier material, crimping said base material on to said insulating strands and dissolving away said carrier material. The base material may be prepared by a printing process of a kind known for the preparation of printed electrical circuits.

According to a feature of the invention in this aspect the crimping of the base material onto the insulating strands is effected by embedding the insulating strands in folds formed in the base material such folds themselves being embedded in a rubber or like deformable matrix, and applying pressure to the assembly so as to crimp the base material into firm engagement with the insulating strands.

A further provision which may be made according to the invention is that of a glass fabric screen, adapted to carry a fluorescent coating so as to constitute the screen of a cathode ray tube, attached to at least a part of a fabric sheet made as above set forth; such attachment may be by means of a low melting point glass (glass solder). In addition, for the purpose of providing a cathode ray tube capable of producing pictures in colour, the glass fabric screen so attached may be provided with a multi-colour filter mosaic.

In crimping the metallic wires or strips on to the insulating strands as proposed herein, the crimping may be arranged to provide that the metallic wires or strips lie mainly in one plane while the insulating strands lie in a plane spaced therefrom, the metallic wires or strips having neck portions formed by the crimping extending between the two planes; the spacing thus achieved provides the spacing required between the electrode array and the screen in a cathode ray tube designed to give a coloured picture.

According to the invention in another aspect there is provided apparatus for carrying out a part of the method above described, comprising means, such as a pair of fluted rollers for applying corrugations to the base material, means for implanting a strand of glass yarn or equivalent insulating material in each of the corrugations so formed, a matrix of rubber or like deformable material for supporting the base material with the insulating strands so implanted and means for applying pressure to the matrix to effect crimping of the base material into tight engagement with the insulating strands.

According to a feature of the invention in this aspect, the matrix is formed on the surface of a roller to which the corrugated base material is fed, the insulating strands are supported in parallel relation to one another and the corrugations on the matrix, means are provided for feeding the insulating strands towards the matrix at a speed matched to that of the roller carrying the matrix so that each successive strand enters a corrugation of the base material, and means such as a pressure roller are provided for thereafter compressing the matrix.

Figure 6:
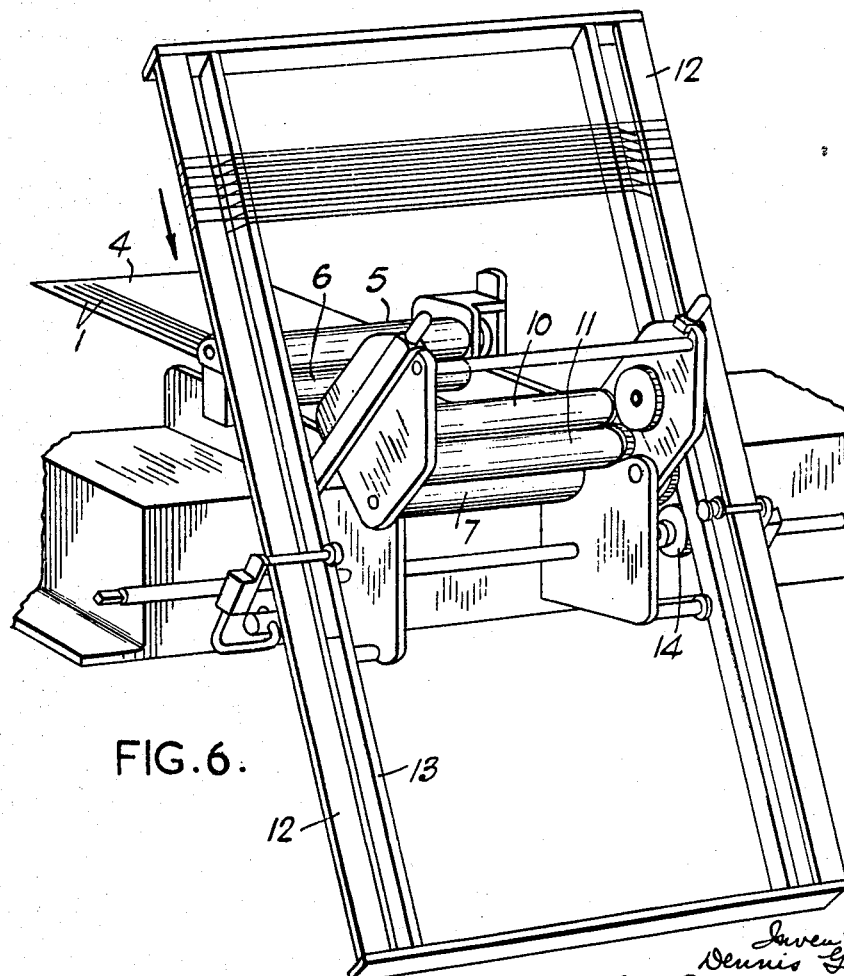

The invention will be better understood from the following description given with reference to the accompanying drawings in which:

Fig. 1 is a perspective view of a fragment of a fabric according to the invention, Figs. 2a and 2b are plan and elevation views of a further piece of fabric illustrating a possibility offered by the invention, Fig. 3 is a fragmentary diagram illustrating part of a method according to the invention, Figs. 4a, 4b and 4c are fragmentary diagrams illustrating further parts of that method, Fig. 5 is a schematic representation of a machine for carrying out the method of Figs. 3 and 4, Fig. 6 is a perspective view of the machine illustrated schematically in Fig. 5, Figs. 7a and 7b are fragmentary sectional views of a cathode ray tube screen for television in colour constructed according to the invention, Fig. 8 is a fragmentary sectional view of an alternative form of cathode ray tube screen constructed according to the invention, Fig. 9 is a schematic representation of a machine for fabricating a screen according to Fig. 8 and Fig. 10 is a detail of the machine illustrated in Fig. 9.

Referring to Fig. 1 this shows in perspective and much enlarged in relation to the dimensions contemplated for the purpose, a fragment of fabric according to the invention as made for the electrode array of a cathode ray tube according to the prior patent application above referred to. As can be seen from Fig. 1 the fabric comprises metallic strips 1 crimped on to threads 2 which are preferably of glass yarn. Crimping is carried out in such a way that the portions of the metal strips lying between the glass threads lie in a common plane while the glass threads also lie in a common plane which is spaced from that of the main area of the metal strips. This serves a useful purpose as will be apparent hereinafter.

Figs. 2a and 2b are plan and elevation views respectively, and to a smaller scale, of a further example of fabric according to the invention. In this figure it will be seen that the metallic strips 1 extend initially longitudinally of the fabric and then obliquely across the fabric and then straighten into the longitudinal direction. The areas thus not occupied by the strips 1 are occupied by broader areas of metal such as the wide strip 3. Configurations of this kind are required in carrying out the invention of the prior application above referred to in order to obtain, by folding, an electrode structure having a stagger between the electrode strips on opposite sides of a gap. In addition, wide areas of metal such as the area 3 are required to form special electrodes in the array.

A method of manufacture according to the invention of a fabric such as illustrated in Fig. 1 or 2 will now be described with reference to Figs. 3 and 4. The first step in the method is to make a base material in the form of a pattern of metallic conductors supported on a strip of foil, for example, of nitro-cellulose which acts as a temporary carrier for the metallic conductors. The formation of such a composite material may be carried out by methods known in the art by which electrical circuits are produced by printing. A suitable process is the so-called "etched foil process." For this purpose a metallic foil is first bonded to the supporting carrier foil. The pattern required for the conductors is then laid down on the metal foil by printing or photographically in material suitable to form a resist and the metal foil not so protected is then etched completely away. For the present purpose the metal foil may be cupro-nickel of say 0.002″ thickness, and the supporting carrier foil nitro-cellulose of 0.001″ thickness. Obviously, other supporting foils can be used so long as they are unaffected by the etching process by which the unwanted metal is removed and can be dissolved away leaving the metal later in the process.

The pattern of metal conductors thus formed on the carrier foil must, of course, be designed to allow for the length taken up by the crimping process.

The first step in the crimping process is to corrugate the base material. This may be carried out between fluted rollers or in a press and Fig. 3 shows on a much enlarged scale and in section how the preliminary corrugation takes place between two suitably fluted rollers 5 and 6 only fragments of the surface of which are depicted in the drawing. The teeth on the roller 5 are narrow and the spaces between them relatively wide, while on roller 6 the teeth are wide and the spaces between them relatively narrow. The base material is thus corrugated into the form shown in section in Fig. 3 which shows the metallic conductor 1 supported on a foil carrier 4. Assuming that rollers are used as in Fig. 3 it is preferable to make them of as small a diameter as strength requirements will permit so that only a small number of teeth engage the foil at a time. In this way the risk of tearing the foil is minimised.

The next two steps of the process are illustrated in Figs. 4 a, b and c. In Fig. 4a there is shown a fragment of the surface of a special roller made for this purpose. This roller comprises a metal foundation 7 on which is mounted a layer 8 of rubber, neoprene, or other suitable material of a medium hardness. The layer 8 is provided with grooves 9 spaced to correspond to the spacing of the corrugations formed in the base material as above described with reference to Fig. 3. The grooves 9 can be formed by moulding or by grinding. For the purpose to which this invention is directed the layer 8 may be about .025″ thick.

Fig. 4b shows the corrugated foil being introduced into the grooves 9, with a glass thread 2 laid in each corrugation. This operation is performed by means of a further roller 10 having teeth suitably shaped to enter the corrugations on top of the glass threads 2 and ram the glass threads and the foil right home into the grooves 9.

The final step in the crimping process is the application of pressure to the surface of the foil as it lies in the matrix 8. For this purpose, a further roller 11 having a smooth surface is used. As rubber is virtually incompressible a very heavy pressure can be applied to roller 11 without danger of distorting the foil and glass thread structure from the form dictated by the rubber matrix. The metal is thus plastically deformed so as to retain its shape after the pressure is removed and very sharp curvatures can be obtained.

By the use of this method a fabric can be produced having 30–40 threads per inch, or possibly more, and accurately dimensioned. Although the method has been described by reference to the use of rollers for the corrugating and crimping processes obviously flat plates suitably profiled may alternatively be used.

For the purpose of carrying out the process above described in a continuous manner a rolling mill may be used of a form which will now be described with reference to Figs. 5 and 6 of the drawings. Fig. 6 illustrates diagrammatically the layout of the machine. The rollers 5 and 6 of Fig. 3 are shown to the left of the drawing and roller 7 with the rubber matrix 8 to the right. Roller 10 shown in Fig. 4b and roller 11 of Fig. 4c both bear on the surface of roller 7. The composite base material is fed in between the rollers 5 and 6, is corrugated and feeds on to the surface of roller 7. The glass threads 2 are supported in a frame not shown in Fig. 5 and are fed downwardly at an angle into the grooves of the corrugated foil close beneath the teeth of roller 10 so as to be engaged and rammed home by the teeth of roller 10 before they have been moved far out of their original line. Once the teeth of roller 10 have engaged them they may be severed from the supporting frame by a knife suitably positioned. Between the roller 10 and the roller 11 the glass threads are sufficiently firmly held in the grooves of the base material which is retained in the grooves of matrix 8 until the assembly passes under the pressure roller 11, the finished fabric being drawn out below the roller 11 tangentially to roller 7.

The machine is shown in more detail in the perspective view of Fig. 6. In this figure the various rollers are identified by the same reference numerals as those used in Figs. 3, 4 and 5. In this figure, however, the frame serving to introduce the glass threads is also shown. Before the start of the operation the glass yarn is wound around the large rectangular frame 12 being located in suitable notches in the edges of the frame and then the strands are all brought into a common plane by means of two side members 13 also notched so as to locate each bight of the thread in its proper spaced relation. The side members 13 are provided on their under edges with rack teeth (not shown in the drawing). These teeth are engaged by gear wheels one of which is visible at 14 which serve to move the whole frame downwards at the proper speed to feed in the glass threads. Naturally the length of the frame is made such that an area at the bottom can be left free of glass threads so that the frame can be slipped over the crimping rollers into position on its supporting and guiding rollers and into engagement with the gear wheels. A trip release mechanism is preferably included to disengage the gear wheels 14 from the rack so as to prevent the frame being moved down so far as to damage the crimping rollers.

In a modification of the machine just described the frame 12 is replaced by a pair of wheels of large diameter, located one on each side of the machine. The wheels have notches or pegs on their peripheries upon which the glass yarn may be wound back and forth so as to present the correct spacing between successive spans. The yarn may be wound on from a reel or bobbin by an arm swung to and fro at the appropriate speed to guide and tension the yarn onto the wheel peripheries as the wheels turn to bring successive spans into engagement with the corrugated base material, thus maintaining a constant number of spans always available. In this way the process may be made quite continuous so as to produce a continuous length of fabric which may subsequently be cut up into the appropriate lengths to form individual cathode ray tube electrode structures. Obviously if this is done the pattern of conductors laid down on the carrier foil will be a repetitive one, each cycle of which corresponds to an integral electrode structure.

Once the fabric has been crimped the carrier foil is dissolved away, for example, in a bath of amyl acetate if the carrier foil is nitro-cellulose.

Figs. 7a and b are two fragmentary views of a cathode screen and electrode array constructed with the use of the fabric according to this invention. Fig. 7a shows the metallic conductors 1 and the glass threads 2 mounted on a glass plate 15 which may be the front wall of the cathode ray tube. On the surface of the glass plate 15 is the usual layer of fluorescent powder 19 and between this and the glass plate 15 there is shown a layer the purpose of which is illustrated in Fig. 7b. It is a colour filter layer having red, green and blue strips 16, 17 and 18, running parallel to the metallic conductors 1. The dotted lines in Fig. 7b show three bundles of rays entering the space between two adjacent metallic conductors at different angles so as to fall respectively on to the differently coloured strips. It will be seen how the spacing between the metallic conductors and the screen required for this purpose is achieved by the crimped fabric according to the invention. The fabric consisting of the metal strips 1 and glass threads 2 may be secured to the glass plate 15 for example by means of a glass soldering process. The ribs formed by the glass threads 2 are dipped into a suspension of finely ground low melting point glass (melting point e.g. 500° C.) in a solution of nitro-cellulose in amyl acetate and when the assembly is suitably heated the low melting point glass fuses to form a secure bond between the fabric and the fluorescent powder as shown at 20.

An alternative form of screen according to the invention is shown in Fig. 8 in which the fabric consisting of metallic strips 1 and glass threads 2 is soldered by the glass soldering technique above described to a woven glass fabric sheet 21. The fluorescent powder 19 is applied to the surface of the glass fabric 21. Though glass cloth appears translucent, it has now been found that it is actually transparent for patterns close to its surface, which are not appreciably diffused or distorted. It is also found that with a carefully dosed quantity of glass solder 20 and suitable heat treatment, not only adhesion is secured, but the transparency of the glass cloth is increased, near the spots 20. One can even transform the glass cloth this way into an optically almost homogeneous sheet of .0015–.002" thickness, which is rather fragile, but will stand up to operation if it has been previously fixed in a frame of matching expansion. On the other hand it may be noted that it is not necessary to match the expansion coefficient of the tape or foil used in the manufacture of the fabric according to the invention to the glass plate or cloth, because it is sufficiently elastic to yield easily, both ways. The use of woven glass cloth in this way as the screen of a cathode ray tube offers attractive possibilities for the production of flat screens, it being cheap in relation to plate glass.

Finally, Fig. 9 shows diagrammatically the layout of a machine which may be used to form screens of the kind shown in Fig. 8. The screens to be formed are to be provided with colour filters such as the strips 16, 17, 18 of Fig. 7b, these being printed on to the woven glass fabric 21. The glass fabric 21 is fed over a guide roller into contact with the surface of a large drum 22 which carries the fabric past three printing rollers serving to apply the three colour filters. Each printing is followed by a drying process such as the application of a blast of hot air as from nozzles 28. After application of the three colour filters and after a final drying the fluorescent powder is sprayed on to the screen through a nozzle 29 and the glass fabric then passes under a roller 30 which serves to press into contact with the coloured and powder coated fabric a composite fabric made according to the process above described and previously dipped in glass solder suspension. The heating required to effect the glass solder bond may be introduced by heating the roller 30 electrically or by playing a thin sheet of flame directly on to the assembly just above the roller 30. The drum 22 is preferably also heated near this zone but in order to prevent the heat from spreading too much, it is preferred to make the drum 22 of a ceramic material which may be coated, for example with graphite, to prevent adhesion of the glass to the ceramic.

The roller 30 is circumferentially grooved so that the lands between the grooves may enter between the metallic strips of composite fabric and bear upon the glass threads 2 so as to press them into close contact with the woven glass fabric.

As an alternative to glass solder, the composite fabric may be attached to the glass fabric by means of a suitable thermosetting plastic such as silicone cement.

The colouring rollers by which the colour filters are applied to the woven glass fabric also require some mention. They preferably consist of thin discs 23 by which the colouring material is applied from a bath 27 on to the glass surface. These discs 23 are separated by discs 24 of smaller diameter so as to provide the correct spacing between successive zones of like colour. The discs 23 and 24 are mounted on a shaft 25 having a tube 26 of rubber or like material covering its surface so that the discs 23 are resiliently pressed against the glass fabric surface. Friction between the discs 23 and 24 should be kept low, and this may be achieved by making the discs 24 of a material such as "Teflon" or by the introduction of grease, care being taken that the colour applying surfaces of discs 23 are kept free of grease. To this end the rims of discs 23 are preferably made grease repellant.

As an alternative to the use of printing rollers as described above, the colour filters could, of course, be applied by spraying through suitable masks. Also, in place of colour filters zones of phosphors having differently coloured fluorescence may be used to provide the colour components of a picture tube of which the screen according to this invention is to form a part. Such zones may be laid down on the glass fabric by spraying through a mask or by a printing technique as above described, or may be formed by a process known as xerography.

In a modification of this type of screen the colour filters are applied to that side of the woven glass fabric opposite to that to which the fluorescent powder and the composite electrode fabric are applied. If the woven glass fabric is not more than about .002" in thickness, very little loss of colour definition results. This enables the formation of a thin transparent layer of fluorescent substance by chemical reaction directly on the surface to be made prior to the printing of the colour strips on the one side and the attachment of the composite electrode fabric to the other.

Additionally the transparency of such a screen may be improved by coating it with a paste of glass solder and nitro-cellulose, for example, in a vehicle of amyl acetate, and heating so as to impregnate the fabric with the glass solder. In this way, moreover, a smoother surface can be given to the glass fabric to improve the printing process shown in Fig. 9. Alternatively a glass fabric impregnated with a silicone varnish may be employed.

It will be appreciated that the cathode ray tube screen for colour television made according to Figs. 7, 8, 9 and 10 is capable of considerable distortion without appreciable loss of operational efficiency since the colour filters and electrode structure will not lose their relative registration.

I claim:

1. Method of making a composite fabric including the steps of bonding metallic foil to a flexible soluble carrier material, etching away selected areas of said metallic foil to leave on said carrier material an assembly of strips of metallic foil appropriately spaced, crimping the material so formed into firm supporting engagement with insulating strands laid transversely to and in contact with said metallic strips and dissolving away said carrier material.

2. Apparatus for manufacturing composite fabric having metallic strands extending in one dimension and insulating strands extending transversely thereto said apparatus comprising means for forming corrugations in said metallic strands, a matrix of deformable material having a groove therein, means for implanting corrugations of a plurality of said metallic strips in side-by-side spaced relation in said groove, means for implanting an insulating strand in the aligned corrugations in said groove and means for compressing said matrix to crimp said metallic strands into close engagement with said insulating strand.

3. Machine for manufacturing composite fabric having longitudinal strands of metallic strip and transverse strands of insulating material comprising means for feeding forward an array formed of a plurality of metallic strips in side-by-side spaced relation, means for applying to said strips corrugations aligned from strip to strip transversely of the array, a matrix roller bearing a matrix of deformable material formed as a surface layer on said roller, grooves in said matrix, means for implanting said aligned corrugations in a groove of said matrix, means for implanting a strand of insulating material in said aligned corrugations and means for applying pressure to the surface of said matrix to close said corrugations around said strand of insulating material.

4. Machine as claimed in claim 3 including a pressure roller for applying pressure to the surface of said matrix roller.

5. Machine as claimed in claim 3 wherein the means for feeding forward said array and for applying corrugations to said strips comprise a pair of rollers and inter-engaging corrugations on the surfaces of said rollers.

6. Machine as claimed in claim 3 including means for feeding said strands of insulating material towards said matrix roller said means comprising a frame embracing said matrix roller, means on said frame for supporting a plurality of strands of insulating material in parallel spaced relation and means for feeding said frame past said matrix roller to bring successive strands of insulating material into engagement with successive corrugation-receiving grooves on said matrix roller.

7. Machine as claimed in claim 6 wherein said frame is planar and mounted for movement in its own plane and gearing is provided for advancing said frame at a linear rate related to the rotational movement of said matrix roller.

8. Machine for manufacturing a fabric web consisting of metal strips extending longitudinally of the web and strands of insulating material extending transversely of the web, comprising a pair of corrugating rollers having inter-engaging fluted surfaces adapted to impart corrugations to said metallic strips when said strips are passed between said rollers, a matrix roller spaced from said corrugating rollers and having a surface layer of deformable matrix material said surface layer being formed with grooves extending longitudinally of said roller and spaced circumferentially thereof to receive successive corrugations of said metallic strips issuing from said corrugating rollers, a frame embracing said matrix roller and extending in a plane at an angle to the plane of said metallic strips where they extend between said corrugating rollers and said matrix roller said frame being mounted for longitudinal movement in its own plane and adapted to carry strands of insulating material wound thereon towards and into engagement with the corrugations of said metallic strips where they lie in respective grooves of said matrix, a fluted roller having flutes positioned each to enter a groove in said matrix as the rollers turn whereby to seat said insulating strands in said corrugations, a pressure roller in compressional engagement with said matrix roller and adapted to exert crimping pressure thereon to deform said matrix and crimp said metallic strips into firm engagement with said metallic strips, means for rotating said rollers at their properly related speeds and means for feeding said frame longitudinally at a rate related to rotational speed of said matrix roller and the spacing of said strands of insulating material on said frame, whereby successive strands of insulating material will be implanted in successive corrugations of said metallic strips.

9. In a machine as claimed in claim 3 a matrix of deformable material provided with grooves of which the depth is greater than the width in the relaxed condition of the matrix whereby in the finished fabric the strands of insulating material will be supported in a plane spaced from the plane of the metallic strips between crimps by necks of said metallic strips.

10. Method of making a screen material for a cathode ray tube for colour picture presentation comprising the steps of fabricating a composite fabric consisting of metallic strips extending in one dimension and strands of insulating material extending in the transverse dimension, said metallic strips being crimped to said strands of insulating material with the strands of insulating material spaced from the main surface of said metallic strips and connected thereto by supporting necks formed of said metallic strips, printing on a woven glass fabric colour filters in the form of strip zones in a repetitive pattern of colour values, coating one surface of said woven glass fabric with fluorescent phosphor material and attaching said composite fabric to the phosphor-coated side of said woven glass fabric with the metallic strips of said composite fabric placed in predetermined relation to said colour filters.

11. Method as claimed in claim 10 in which the attachment of said composite fabric to said woven glass fabric is effected by glass soldering.

12. Method as claimed in claim 10 in which the attachment of said composite fabric to said woven glass fabric is effected by means of thermosetting plastic material.

13. Machine for making a screen for a cathode ray tube for colour picture presentation comprising a carrier drum, means for rotating said drum, means for feeding a web of woven glass fabric into engagement with the surface of said drum, a plurality of printing rollers each having a plurality of spaced colour transferring surfaces adapted to transfer colouring material from a colour bath onto the surface of said glass fabric in contact with said drum said printing rollers being spaced from one another circumferentially of said drum and the colour transferring surfaces of said rollers being staggered transversely of said web with respect to one another whereby a plurality of substantially contiguous zones of colour are applied to said glass fabric thereby, means for feeding into contact with the glass fabric at a point on said drum a composite fabric consisting of transversely spaced longitudinal metallic strips crimped into engagement with transverse glass strands with said glass strands located in a surface spaced from the main surface of said metallic strips, with the surface containing said glass strands in contact with said glass fabric, and means for effecting a union between said composite fabric and said glass fabric at least at points of contact between said glass strands and said glass fabric.

14. Machine as claimed in claim 13 including means for accelerating drying of said colouring material located at points circumferentially spaced around said drum and each following one of said colour transferring rollers in the direction of rotation of said drum.

15. Machine as claimed in claim 13 including means for applying fluorescent phosphor material to a surface of said woven glass fabric.

16. Method of making a composite fabric including the steps of bonding metallic foil to a flexible carrier material, removing selected areas of said metallic foil to leave on said carrier material an assembly of strips of metallic foil appropriately spaced, crimping the material so formed into firm engagement with supporting strands laid transversely to and in contact with said metallic strips, and removing said carrier material.

17. Apparatus for manufacturing composite fabric having metallic strands extending in one dimension and supporting strands extending transversely thereto, said apparatus comprising means for forming corrugations in said metallic strands, a matrix of deformable material having a groove therein for receiving the corrugations of a plurality of said metallic strips in side-by-side spaced relation, means for implanting a supporting strand in the aligned corrugations in said groove, and means for compressing said matrix to crimp the corrugated portions of said metallic strands into close engagement with said supporting strand.

18. Machine for manufacturing composite fabric having longitudinal strands of metallic strip and transverse strands of supporting material comprising means for feeding forward an array formed of a plurality of metallic strips in side-by-side spaced relation, means for forming corrugations in said strips with the corrugations aligned from strip to strip transversely of the array, a matrix of deformable material having grooves therein for receiving said aligned corrugations, means for implanting a strand of supporting material in the aligned corrugations in each of said grooves, and means for applying pressure to said matrix to close said corrugations around said supporting strands.

References Cited in the file of this patent

UNITED STATES PATENTS

| | | |
|---|---|---|
| 1,700,945 | Loppacker | Feb. 5, 1929 |
| 2,416,056 | Kallmann | Feb. 18, 1947 |
| 2,625,734 | Law | Jan. 20, 1953 |
| 2,670,523 | Orthuber et al. | Mar. 2, 1954 |
| 2,691,115 | Jenny | Oct. 5, 1954 |
| 2,740,065 | Jesty | Mar. 27, 1956 |
| 2,767,457 | Epstein | Oct. 23, 1956 |